United States Patent [19]

Burgess, Jr.

[11] 4,023,476
[45] May 17, 1977

[54] DOUGH PROOFING MACHINE

[75] Inventor: Ralph D. Burgess, Jr., Minneapolis, Minn.

[73] Assignee: The Pillsbury Company, Minneapolis, Minn.

[22] Filed: Nov. 7, 1975

[21] Appl. No.: 629,945

Related U.S. Application Data

[63] Continuation of Ser. No. 461,045, April 15, 1974, abandoned.

[52] U.S. Cl. .................................. 99/468; 99/352; 99/478; 99/483
[51] Int. Cl.[2] ........................................ A21B 1/26
[58] Field of Search ............ 99/468, 352, 353, 355, 99/478, 483; 62/407, 408

[56] References Cited

UNITED STATES PATENTS

| | | | |
|---|---|---|---|
| 2,780,182 | 2/1957 | Rand | 99/353 |
| 3,359,750 | 12/1967 | Hanson | 62/408 |
| 3,500,657 | 3/1970 | Johnson | 62/408 |
| 3,518,949 | 7/1970 | Stock | 99/483 |

*Primary Examiner*—Richard E. Aegerter
*Assistant Examiner*—L. Footland
*Attorney, Agent, or Firm*—James V. Harmon; Michael D. Ellwein

[57] ABSTRACT

In the dough proofing machine described a housing contains a conveyor extending in a tortuous path from one end to the other, a heater and steam injector positioned in the center of the housing. Transversely extending vertically disposed plenum walls are located on either side of the heater and extend all the way to the side walls of the apparatus. A blower is associated with the heater to direct the air flow downwardly into a distribution plenum located below the heater and openings are provided in the front and rear of the distribution plenum allowing the air to travel in two substantially balanced symmetrically arranged flow paths, one of which is directed forwardly and upwardly and the other rearwardly and upwardly thereby balancing the conditions of humidity and temperature substantially throughout the entire apparatus. An air flow controller introduces outside air and exhausts circulating air as conditions require.

5 Claims, 5 Drawing Figures

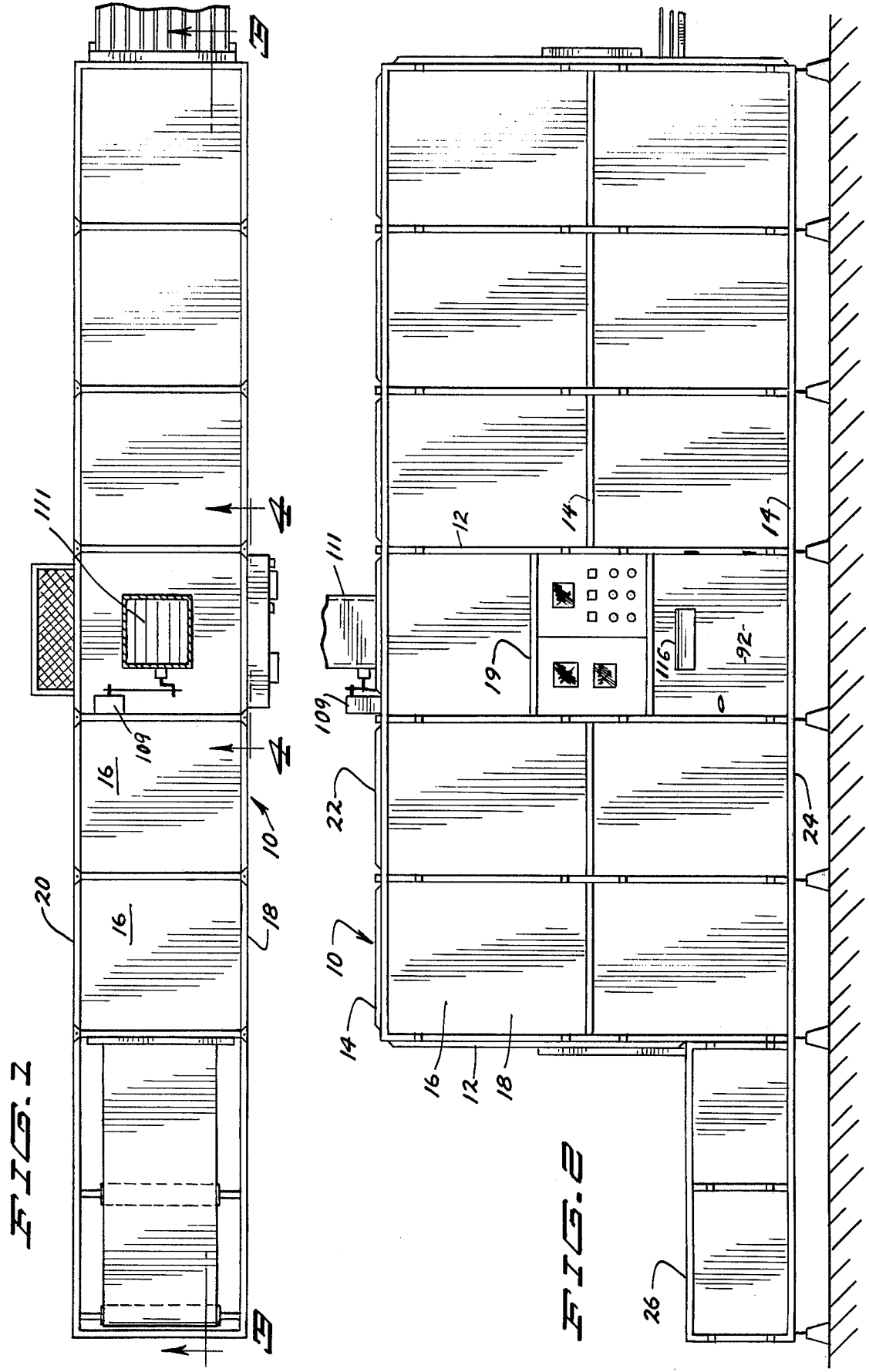

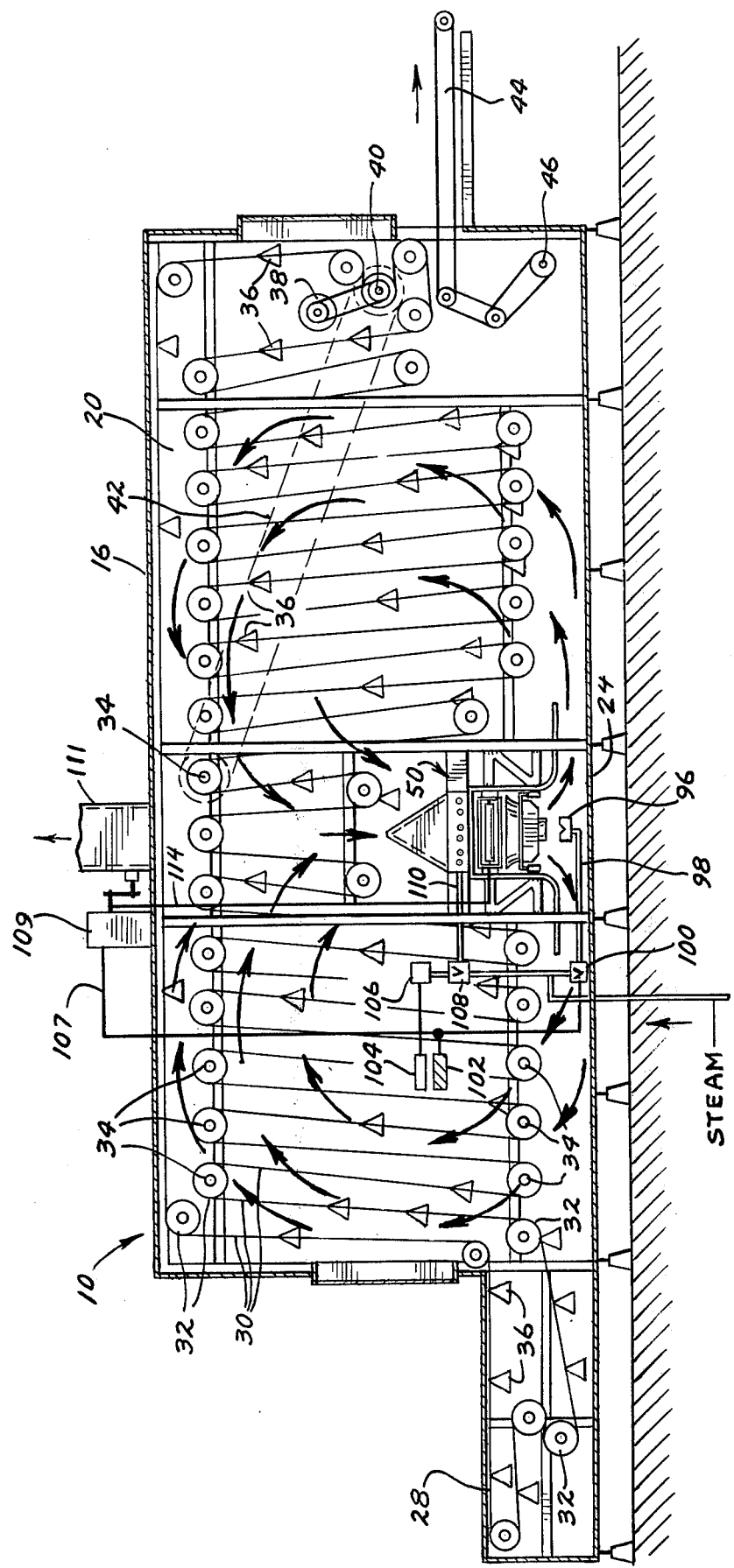

DOUGH PROOFING MACHINE

This is a continuation of applicaton Ser. No 461,045, filed Apr. 15, 1974, now abandoned.

FIELD OF THE INVENTION

The invention relates to food processing equipment and more particularly to apparatus for proofing dough in a moist, warm atmosphere.

THE PRIOR ART

In previously available proofing equipment, substantial complexities have resulted from attempts to uniformly distribute the moist, warm air from one or more heating units at strategically located positions in various parts of the apparatus. This prior equipment has not only been complicated, but has been unsatisfactory from a sanitation standpoint since the accumulation of dust and grease on the blowers has been difficult to prevent and cleaning was time consuming. This introduces the possibility of microbial growth because normal conditions of from about 75° to about 135° F. are not hot enough to effect pasturization. A further problem of sanitation encountered in prior equipment results from dust bacteria, moisture and grease lodging in ducts which carry hot air to the apparatus from a heater located outside the main housing of the proofer. These ducts cannot be entered and often must be partially disassembled for cleaning

OBJECTS

The major objects of the invention are (a) to maintain uniform and symmetrical conditions of moisture and humidity throughout the proofing apparatus, (b) to reduce sanitation problems and specifically to eliminate the requirement for ducts leading from heaters to various parts of the proofing apparatus, (c) providing air baffle means within the proofing apparatus adjacent to a heater to function as ducts normally used for directing the flow of hot air and moisture, (d) provision for maintaining a uniform and balanced flow of moisture throughout the proofer with a single heater, blower and mositurizer unit. (e) provide a proofing apparatus which is made more economical through the elimination of parts, (f) the provision of a heater and blower apparatus within the housing of the proofing apparatus itself including means to facilitate the cleaning of the blower and the heater unit. (g) an effective provision for utilizing the walls and floor of the proofer housing to functon as portions of a air distribution plenum, and (h) a distribution plenum located adjacent to the hearter and blower that will economize materials and facilitate cleaning.

THE FIGURES

FIG. 1 is a plan view of the invention.
FIG. 2 is a side elevational view of the invention.
FIG. 3 is a vertical cross sectional view taken on line 3—3 of FIG. 1.
FIG. 4 is a partial vertical sectional view taken on line 4—4 of FIG. 1.
FIG. 5 is a horizontal cross sectional view taken on line 5—5 of FIG. 4.

SUMMARY OF THE INVENTION

The dough proofing machine of the present invention comprises a housing having an inlet and an outlet with a conveyor extending from the inlet to the oulet, a heater and blower positioned generally in the center of the housing with transversely extending vertically disposed plenum walls forwardly and rearwardly thereof. It is preferred that the plenum walls extend all the way to the side walls of the apparatus. The blower directs the air flow vertically either upwardly or downwardly into a distribution plenum located above or below the heater as the case may be. Air passages are provided in the front and rear of the distribution plenum and connected therewith for allowing the air to travel from the distribution plenum in two substantially balanced symmetrically arranged flow paths, one of which extends forwardly and the other rearwardly thereby substantially balancing the conditions of temperature throughout the housing. Means is preferably provided to control the humidity within the housing such as an air flow controller means for introducing an exhausting air from the housing. In one preferred form of the invention, the heater and blower is movably mounted in the housing to facilitate its temporary removal from the housing.

DESCRIPTION OF THE PREFERRED EMBODIMENT

As seen in the figures, the proofing apparatus includes the usual vertical and horizontal frame members 12 and 14 repectively to which are secured side panels 16 that form left and right side walls 18 and 20, top wall 22, bottom wall 24 and a forward extension 26 which supports the forward inlet end 28 of an endless chain conveyor 30 consisting of a multiplicity of vertical runs entrained over a plurality of laterally placed pairs of sprockets 32 each mounted on longitudinally and vertically spaced shafts 34 journalled for rotation on the side walls 18 and 20. Electrical controls are indicated at 19 in wall 18 (FIG. 2).

The conveyor 30 is provided with a plurality of longitudnally spaced article trays 36 for the dough products that are to be proofed in the aparatus. The chain conveyor 30 and the proofing trays 36 per se form no part of the invention and can be of any suitable known construction. A drive motor 38 operates the conveyor at two points thereon via shaft 40 and a chain and sprocket assembly 42 which is connected to one of the shafts 34 at the approximate center of the conveyor. A take-away conveyor provided at 44 is driven by motor 46.

Located generally in the center of the proofing apparatus 10 is a combined heater and air blower indicated generally at 50. The blower is located vertically of the heater and in this case below it. As seen best in FIGS. 4 and 5 it is supported on brackets 52 and 54 which are in turn fastened to laterally spaced pairs of posts 56 and 58. The heater is designated 60 and in this instance consists of a tube and plate type steam heating coil, including steam tube 62 and plates 64 (FIG. 5). A wire guard 80 is provided above the heater 60 to prevent material from falling into the heater. The heater 60 is supported on the upper ends of vertically disposed parallel and transversely extending longitudinally spaced baffle plates 66 and 68 which bend forwardly at 70 and rearwardly at 72 respectively to define and air distribution plenum 74 which terminates at its forward and rearward ends as channels 76 and 78 respectively for distributing the downward current of air that passes through the plenum forwardly and rearwardly as shown in FIG. 3. The forward and rearward walls 66 and 68 of the distribution plenum 74 are provided on their side edges nearest the door 92 with elastic sealing strips 67 and 69 which abutt against the door when the door is closed, thereby effectively sealing the plenum on each end.

Motion is imparted to the air by three fans 84 each surrounded by a fan duct 86. The fans are mounted upon a support plate 88 having downwardly turned forward and rearward edges in contact with the upper edges of wheels 90 mounted on the plenum walls 66 and 68 to allow the fans to be manually drawn out through the side of the apparatus the fans to be manually drawn out through the side of the apparatus for cleaning when the door 92 is open.

Steam is introduced into the air to maintain its moisture content at the desired level through a distribution nozzle 96 connected via pipe 98 as shown in FIG. 3 to steam control valve 100 that is in turn connected to a relative humidity sensor 102 located within the apparatus. A temperature sensor 104 is connected to a controller 106 that regulates steam valve 108 in line 110 for controlling the temperature of the heater 60. The relative humidity sensor 102 is also connected via conductor 107 to a controller such as a proportional electric controller 109 that regulates the position of infinitely variable positioning outlet valve 111 as well as an inlet valve 112 on either side of the apparatus by means of a vertical control rod 114. The inlet valves 112 (only one of which is shown) each communicates through an opening 116 in the side wall 16 of the housing. It will thus be noticed that the side walls 18 and 20 of the apparatus itself form the sides of the plenum 74 and the bottom of the plenum is formed by the bottom wall 24 of the apparatus thereby economizing the use of sheet metal and eliminating the requirement for ducts which are difficult if not impossible to enter for cleaning.

The exhaust port 111 and the intake port 112 are operated in unison so that they both open at the same time. For the most part during the operation these valves are partly open. It should be understood that if the humidity becomes excessive, more air is introduced and more of the moist air is exhausted. When the humidity is too low, the valves 111 and 112 move toward the closed position. The capacity of the fans is sufficient to provide a flow of approximately 100 lineal feet per minute past the product contained in the supporting trays 36 at various points throughout the apparatus.

It can be seen that the invention provides uniform flow of moist air in a symmetrical pattern forwardly and rearwardly from the centrally located heater-blower unit 50 as best seen in FIG. 3. Accordingly, the dough is exposed to uniform conditions during the many minutes of treatment. This helps to improve product uniformity and tends to reduce the fermentation time required. Moreover the apparatus can easily be cleaned since the fans can be slid laterally out through the door 92. The apparatus is also economical to build and operate since no long ducts are needed. The door 92 provides access for cleaning both the plenum and the fans 84. The side walls of the apparatus and the floor 24 functions in effect as part of the duct work used for the air circulation.

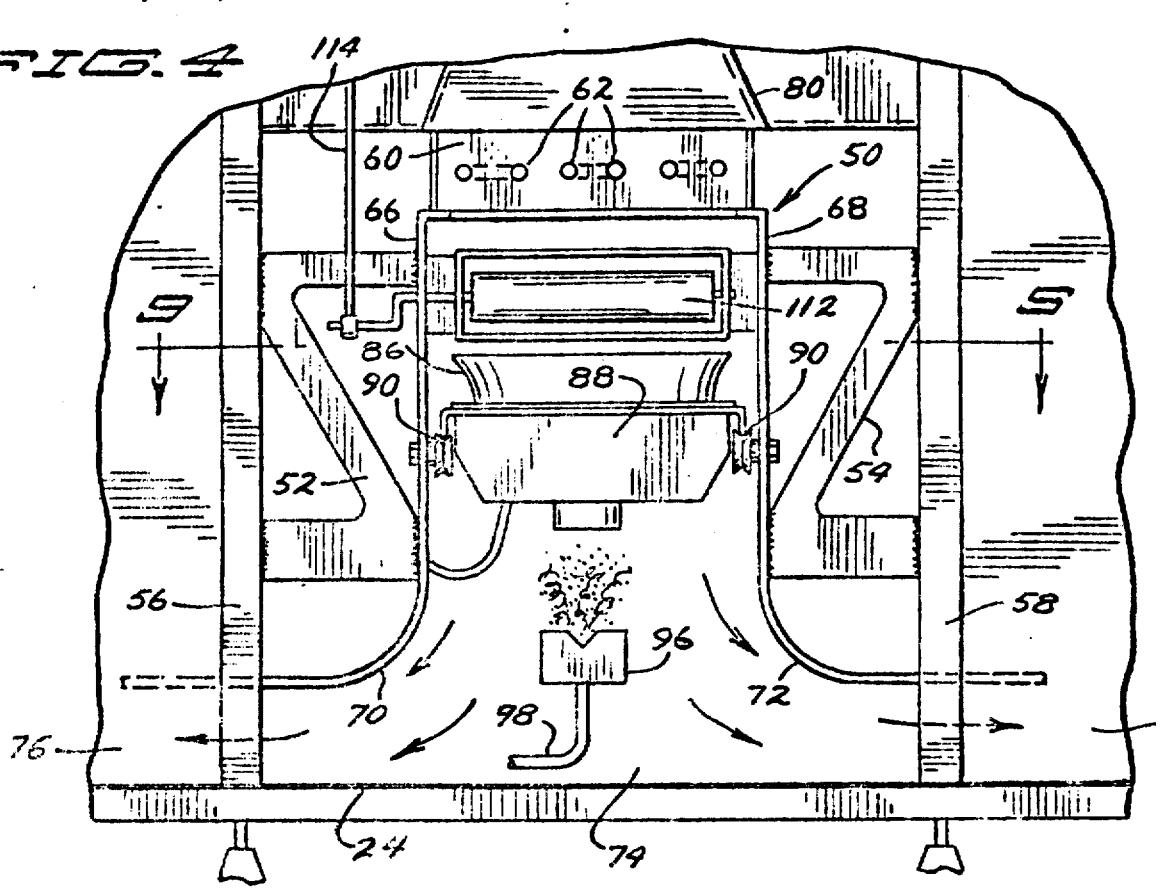
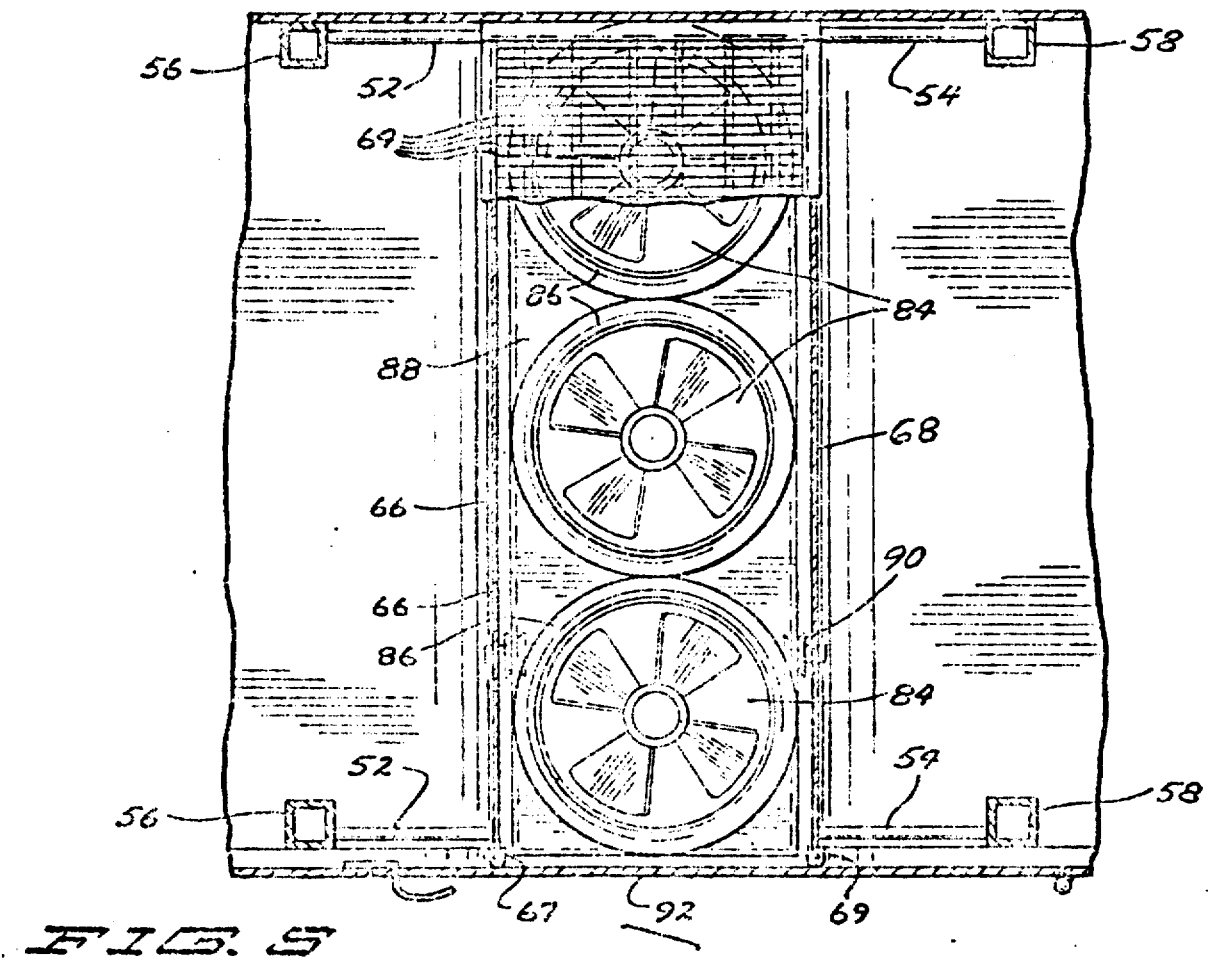

What is claimed is:

1. A dough proofing apparatus comprising an elongated housing having inlet and oulet openings at the respective ends thereof, two spaced apart side walls and spaced apart top and bottom walls to define a proofing chamber that extends from the inlet to the outlet opening, an endless conveyor extending through the housing from the inlet opening to the outlet opening, the conveyor including a multiplicity of runs entrained over a plurality of laterally spaced pairs of sprockets mounted upon longitudinally and vertically spaced shafts within the housing to carry said dough along a tortuous path through the apparatus from the inlet opening to the outlet opening, two baffles dividing said chamber within the housing into three compartments, the compartments comprising a left compartment adjacent to and communicating with the outlet opening, a right compartment adjacent to and communicating with the inlet opening and a substantially centrally located compartment between the right and left compartments, said baffles comprising two transversely extending vertical and lonitudinally spaced apart baffle plates, the upper and lower ends of the baffle places being spaced from said top and bottom walls of the housing and defining a plenum therebetween, said plenum communicating at its forward and rearward ends with said left and right compartments, a heater in the centrally located compartment and a means mounted within the centrally located compartment to add moisture to the air, humidity sensor provided in said proofing apparatus, air valve means opening through the housing to the atmosphere outside of the housing, said air valve means being operatively connected to the humidity sensor for increasing the amount of outside air introduced from the atmosphere and the inside air exhausted to the atmosphere when the humidity reaches a predetermined upper level, a temperature sensor means mounted within the housing operatively connected to the heater for controlling the temperature thereof, a blower in the centrally located compartment to blow the air in the left compartment on a circular path across the top thereof, vertically through the centrally located compartment, across the bottom in the opposite direction and vertically adjacent to the outlet opening and blow the air in the right compartment on a circular path but in opposite direction as seen from the same side of the housing so as to proceed across the top of the right compartment, vertically adjacent the inlet opening, across the bottom in the opposite direction and vertically through the center compartment, whereby all air flow is entirely within the confines of the chamber to maintain substantially uniform and symetrical conditions of humidity and balanced temperature throughout the housing.

2. A dough prooding apparatus comprising an enlongated housing having inlet and outlet openings at the respective ends thereof, two spaced apart side walls and spaced apart top and bottom walls to define a proofing chamber that extends from the inlet to the outlet opening, an endless conveyor extending through the housing from the inlet opening to the outlet opening, the conveyor including a multiplicity of runs entrained over a plurality of laterally spaced pairs of sprockets mounted upon longitudinally and vertically spaced shafts within the housing to carry said dough along a tortuous path through the apparatus from the inlet opening to the outlet opening, two baffles dividing said chamber within the housing into three compartments, the compartments comprising a left compartment adjacent to and communicating with the outlet opening, a right compartment adjacent to and communicating with the inlet opening and a substantially centrally located compartment between the right and left compartments, said baffles comprising two transversely extending vertical and longitudinally spaced apart baffle plates, the upper and lower ends of the baffle plates being spaced from said top and bottom walls of the housing and defining a plenum therebetween, said plenum communicating at its forward and rearward ends with said left and right compartments, a heater in the centrally located compartments and a means mounted within the centrally located compartment to add moisture to the air, humidity sensor means in said proofing apparatus, humidity control means operatively connected to the humidity sensor means to change the humidity resonsive to the humidity level sensed by said humidity sensor means for increasing the humidity when the sensed humidity is below a predetermined level and for decreasing the humidity when the humidity sensed thereby is above a predetermined upper level to thereby prevent excessive humidity when the humidity reaches said predetermined upper level, a temperature sensor operatively connected to the heater for controlling the temperature thereof, a blower in the centrally located compartment to blow the air in the left compartment on a circular path across the top thereof, vertically through the centrally located compartment, across the bottom in the opposite direction and vertically adjacent to the outlet opening and blow the air in the right compartment on a circular path but in the opposite direction as seen from the same side of the housing so as to proceed across the top of the right compartment, vertically adjacent the inlet opening, across the bottom in the opposite direction and vertically through the center compartment, whereby all air flow is entirely within the confines of the chamber to maintain substantially uniform and symetrical conditions of humidity and balanced temperature throughout the housing.

3. The apparatus of claim 2 wherein a door is provided in the side of said housing and the blower is mounted for movement into and out of said housing through the door so as to permit its temporary removal from the housing to facilitate cleaning and its replacement therein.

4. The apparatus of claim 2 whrein the blower and heater are located vertically with respect to one another, the baffle nearest the inlet bends toward the inlet at its lower end and the baffle nearest the outlet bends toward the outlet at its lower end to define air passages communicating with the plenum that direct air toward the inlet and the outlet.

5. The apparatus of claim 2 wherein a door is provided in the side of said housing through which the blower can be removed, the blower and heater are located vertically with respect to one another and said blower is removably mounted within the apparatus so as to permit its temporary removal from the housing through the door to facilitate cleaning, the baffle nearest the inlet bends forwardly toward the inlet at its lower end and the other baffle bends rearwardly at its lower end to define forward and rearward air passages communicating with the plenum, the housing bottom wall defines the bottom of the plenum, the blower is located adjacent to and vertically of the heater and the blower is operated to direct the flow of air downwardly through the plenum and thence forwardly and rearwardly through said forward and rearward air passages.

* * * * *

UNITED STATES PATENT OFFICE
CERTIFICATE OF CORRECTION

Patent No. 4,023,476      Dated May 17, 1977

Inventor(s) Ralph D. Burgess, Jr.

It is certified that error appears in the above-identified patent and that said Letters Patent are hereby corrected as shown below:

Figures 4 and 5 should be added as shown on the attached sheet.

Signed and Sealed this

First Day of November 1977

[SEAL]

Attest:

RUTH C. MASON
*Attesting Officer*

LUTRELLE F. PARKER
*Acting Commissioner of Patents and Trademarks*